US011907741B2

(12) United States Patent
Wang et al.

(10) Patent No.: US 11,907,741 B2
(45) Date of Patent: Feb. 20, 2024

(54) VIRTUAL INPUT DEVICE-BASED METHOD AND SYSTEM FOR REMOTELY CONTROLLING PC

(71) Applicant: Shanghai Dalong Technology Co., Ltd., Shanghai (CN)

(72) Inventors: Zheng Wang, Shanghai (CN); Bingyan Yang, Shanghai (CN); Shuying Liu, Shanghai (CN); Yilei Chai, Shanghai (CN); Meilong Yao, Shanghai (CN)

(73) Assignee: Shanghai Dalong Technology Co., Ltd., Shanghai (CN)

( * ) Notice: Subject to any disclaimer, the term of this patent is extended or adjusted under 35 U.S.C. 154(b) by 0 days.

(21) Appl. No.: 17/537,436

(22) Filed: Nov. 29, 2021

(65) Prior Publication Data
US 2022/0188054 A1 Jun. 16, 2022

Related U.S. Application Data

(63) Continuation-in-part of application No. 16/764,034, filed as application No. PCT/CN2019/101984 on Aug. 22, 2019, now abandoned.

(30) Foreign Application Priority Data

Sep. 30, 2018 (CN) .......................... 201811154833.8

(51) Int. Cl.
G06F 9/451 (2018.01)
G06F 3/04847 (2022.01)
(Continued)

(52) U.S. Cl.
CPC ............ *G06F 9/452* (2018.02); *G06F 3/0482* (2013.01); *G06F 3/04845* (2013.01);
(Continued)

(58) Field of Classification Search
CPC .... G06F 9/452; G06F 3/0482; G06F 3/04845; G06F 3/04847; G06F 3/04886; H04L 67/025
See application file for complete search history.

(56) References Cited

U.S. PATENT DOCUMENTS 6,094,197 A * 7/2000 Buxton ................. G06F 3/0482
715/863
7,242,387 B2 * 7/2007 Fitzmaurice ........ G06F 3/04886
345/157

(Continued)

FOREIGN PATENT DOCUMENTS

CN 103513896 A 1/2014
CN 103607618 2/2014
(Continued)

*Primary Examiner* — Ryan F Pitaro
(74) *Attorney, Agent, or Firm* — IPRTOP LLC

(57) ABSTRACT

The present disclosure provides a method for remotely controlling a personal computer (PC). from a mobile device. The method includes displaying, by a first input module operating on the mobile device, an input GUI on the mobile device. The first input module interacts with a second input module operating on the PC. The method includes, upon receiving an activation of a virtual input on the input GUI, retrieving a first simulated input that is associated with the virtual input. The method further includes transmitting the first simulated input to the second input module, wherein the second input module is configured to perform the first simulated input on the PC in response to the activation of the virtual input on the input GUI.

19 Claims, 8 Drawing Sheets

(51) Int. Cl.
  *G06F 3/04886* (2022.01)
  *H04L 67/025* (2022.01)
  *G06F 3/0482* (2013.01)
  *G06F 3/04845* (2022.01)
  *G06F 3/14* (2006.01)

(52) U.S. Cl.
  CPC ...... *G06F 3/04847* (2013.01); *G06F 3/04886* (2013.01); *G06F 3/14* (2013.01); *H04L 67/025* (2013.01)

(56) References Cited

U.S. PATENT DOCUMENTS

| | | | | |
|---|---|---|---|---|
| 10,929,013 | B2* | 2/2021 | Wang | G06F 3/0236 |
| 11,093,046 | B2* | 8/2021 | Hassan | G06F 3/017 |
| 11,169,831 | B1* | 11/2021 | Semenov | H04L 67/75 |
| 2009/0178011 | A1* | 7/2009 | Ording | G06F 9/453 |
| | | | | 715/863 |
| 2010/0192102 | A1* | 7/2010 | Chmielewski | G06F 3/0488 |
| | | | | 715/834 |
| 2013/0016048 | A1* | 1/2013 | So | G06F 3/038 |
| | | | | 345/173 |
| 2013/0019182 | A1* | 1/2013 | Gil | G06F 3/0482 |
| | | | | 715/834 |
| 2013/0169549 | A1* | 7/2013 | Seymour | G06F 3/041 |
| | | | | 345/173 |
| 2014/0055400 | A1* | 2/2014 | Reuschel | G06F 3/041 |
| | | | | 345/173 |
| 2014/0075388 | A1* | 3/2014 | Kuscher | G06F 3/04883 |
| | | | | 715/834 |
| 2014/0337748 | A1* | 11/2014 | Lee | G06F 3/1454 |
| | | | | 715/740 |
| 2015/0135079 | A1* | 5/2015 | Oh | G06F 3/04886 |
| | | | | 715/771 |
| 2015/0138089 | A1* | 5/2015 | Angerbauer | G06F 3/03547 |
| | | | | 345/157 |
| 2016/0124760 | A1* | 5/2016 | Morton | H04L 65/80 |
| | | | | 715/744 |
| 2016/0371048 | A1* | 12/2016 | Morris | G06F 40/197 |
| 2020/0133616 | A1* | 4/2020 | Zong | G06F 9/452 |
| 2021/0240312 | A1* | 8/2021 | Wohlstadter | G16H 40/63 |
| 2022/0164091 | A1* | 5/2022 | Kang | H04M 1/72412 |
| 2023/0161686 | A1* | 5/2023 | Subotic | G06F 8/433 |
| | | | | 717/124 |

FOREIGN PATENT DOCUMENTS

| | | |
|---|---|---|
| CN | 109358937 | 2/2019 |
| WO | 2011123840 A | 10/2011 |

* cited by examiner

UI
210

UI
220

UI
230

UI
240

UI
310

Trick-Ring
321

UI
320

VIRTUAL INPUT DEVICE-BASED METHOD AND SYSTEM FOR REMOTELY CONTROLLING PC

CROSS REFERENCE TO RELATED APPLICATION

The present application is a continuation-in-part application claiming the benefit of priority to a U.S. patent application Ser. No. 16/764,034, filed on May 14, 2020 and entitled "VIRTUAL INPUT DEVICE-BASED METHOD AND SYSTEM FOR REMOTELY CONTROLLING PC", which is a Sect. 371 National Stage application of a PCT International Application No. PCT/CN2019/101984 filed on Aug. 22, 2019, which claims the benefit of priority of a Chinese Patent Application No. CN201811154833.8 filed with CNIPA on Sep. 30, 2018, the disclosure of the above applications are incorporated herein by reference in their entirety for all purposes.

TECHNICAL FIELD

The present disclosure relates to a method for controlling personal computer (PC) and, more specifically, to a method and system for remotely controlling a PC based on a mobile device.

BACKGROUND

The continuous advancement of science and technology, as well as the increasing popularity of smart mobile devices, is giving rise to an increasing variety of new mobile phones, tablets and wearable smart devices of various functionalities. Nevertheless, most of them rely on user's tapping or pressing on the soft/virtual keyboards for inputting of information. However, such soft keyboards are mostly similar in layout and design. Although, some of them being customizable via software, this technique is implemented mainly for mobile applications.

Recent advancements in cloud computing have enabled a few enterprises to provide users with accessibility to a remote PC's desktop through using a mobile device, for manipulating applications thereon, such as PC games, social software and office software, as if controlling locally on the remote PC's desktop. However, at the current stage, input operations for this cloud service provided by the manufacturers are carried out with the aid of peripherals such as physical keyboards and mouses as well as gamepads. At present, it is difficult to utilize a virtual input interface, rather than a physical peripheral, in mobile device in order to access a remote PC, or to switch between the mobile device and the remote PC in a seamless manner.

SUMMARY OF THE DISCLOSURE

In view of the aforementioned shortcomings, it is an objective of the present disclosure to provide a method and system, which allows a user to remotely access a PC through using a mobile device and perform peripheral-like operations without using physical peripherals.

DETAILED DESCRIPTION

Figure 1:
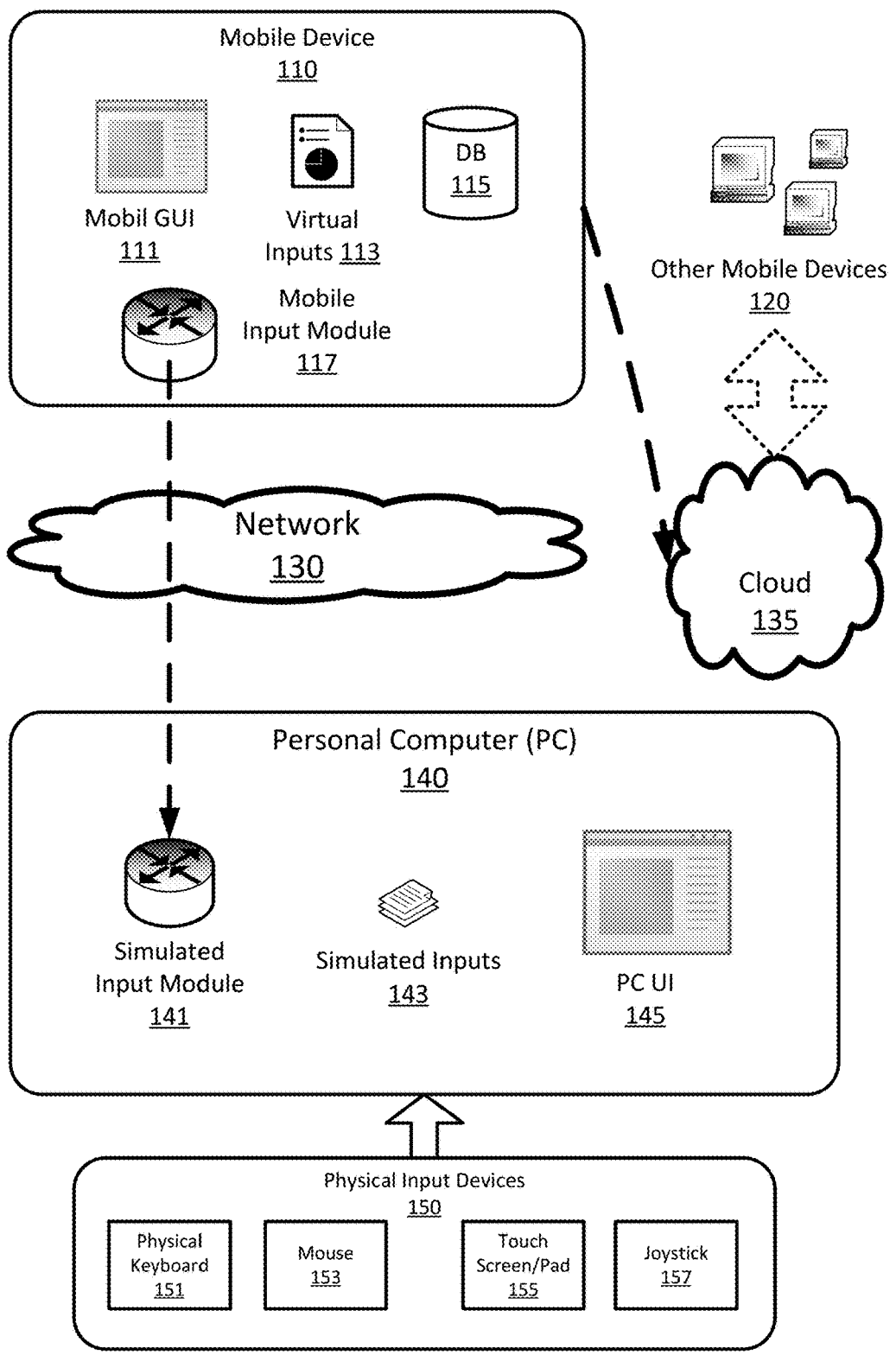
FIG. 1 illustrates a remote controlling computing environment configured to allow mobile devices to remotely control a personal computer (PC), according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a remote controlling computing environment configured to allow mobile devices to remotely control a personal computer (PC), according to one or more embodiments of the present disclosure. In FIG. 1, the remote controlling computing environment may include one or more mobile devices 110 and 120 (also known as "remote computers", "remote devices", "clients", "remote systems", etc.) communicating with a personal computer (PC) 140 via a physical network 130. The remote devices 110 and 120 may be smart phones, mobile phones, tablets, personal data assistants (PDAs), or any computing devices having a display screen and inputting mechanisms (e.g., touch screens, keyboards, mouses, or touchpads, etc.). Alternatively, the mobile device 110 and 120 may be a web-based application operating in a browser environment. For illustrative purposes, the mobile device 110 may be used hereafter to represent the other mobile devices 120.

In some embodiments, the network 130 may be any wired or wireless network that supports network communications via Transmission Control Protocol/Internet Protocol (TCP/IP), Hypertext Transfer Protocol (HTTP), or any other network communication means. Examples of the network 130 may include LAN, WIFI, WAN, Cellular Networks (e.g., 3G, 4G, 5G network). From the perspective of the mobile device 110, the PC 140 may also be referred to as a "remote server", "server", "host", or "remote system."

In some embodiments, the PC 140 may be any cell phone, smart phone, personal computer, tablet, laptop, workstation, server, or electronic devices (e.g., TV, projector, touch screen, kiosk, etc.) that can interact with a user via one or more physical input devices 150 connected to the PC 140. Examples of physical input devices 150 may include physical keyboard 151, mouse 153, touchscreen or touchpad 155, and joystick 157. The physical input devices 150 may be connected to ports of the PC 140 either via physical links (e.g., an electronic wires), or by wireless communications (e.g., Bluetooth® or WIFI etc.)

In some embodiments, each of the physical input devices 150 may be configured to provide one or more physical inputs to the PC 140. A "physical input" may be an input signal/command/action/operation generated by the pressing of one physical button (or key) on the physical keyboard 151, the pressing/touching/moving of one physical button or scroll of the mouse 153, a single touching/moving/tapping of the touch screen/pad 155, and/or a single pressing of physical button or scroll of a joystick 157.

In some embodiments, an "input operation" may be a specific input received and interpreted by the user interface running on the PC 140. Each input operation may be generated by one or more corresponding physical inputs. For example, a physical input may be the pressing of a button "j" on the keyboard 151, and the corresponding input operation may be the inputting of the character "j" into a user interface running on the PC 140. In another example, an input operation may be the input of capital character "J" which may be generated by two physical inputs of pressing two keyboard buttons "shift" and "j" simultaneously. In a further example, an input operation may be the enlarging of a displayed image, which may be generated by two physical inputs of two fingers simultaneously touching and expanding away from each other on the touchpad 153.

In some embodiments, the PC 140 may include a simulated input module 141 configured to simulate physical inputs generated by the physical input devices 150. Specifically, the simulated input module 141 may be a software module executing in the operating system of the PC 140. Alternatively, the simulated input module 141 may be implemented as a computer chip or a hardware board plugged into the PC 140. When operating, the simulated input module 141 may generate and/or transmit one or more simulated inputs 143 to the PC 140. And from the perspective of the PC 140 these simulated inputs 143 may be identical to the physical inputs provided by the physical input devices 150. In other words, the simulated input module 141 may be operating in an operating system level, to allow the simulated inputs to be interpreted and transmitted to a user interface similarly as the physical inputs being transmitted to the user interface.

In some embodiments, similar to the physical input's case, each input operation may also be generated by one or more corresponding simulated inputs. For example, a simulated input may be simulating pressing of a button "j" on the keyboard 151, and the corresponding input operation may be the inputting of the character "j" into a user interface running on the PC 140. In another example, an input operation may be the input of capital character "J" which may be generated by two simulated inputs, which simulate the pressing of two keyboard buttons "shift" and "j" simultaneously. In a further example, an input operation may be the enlarging of a displayed image, which may be generated by two simulated inputs of two fingers simultaneously touching and expanding away from each other on the touchpad 153.

In some embodiments, an input operation may be interpreted as a logic input received by the user interface. In this case, a physical input may be associated with a simulated input, and vise-versa, when both of these inputs may be interpreted by PC 140 as generating the same input operation for the user interface. For example, a physical input generated by pressing a button "j" on the keyboard 151 may be associated with a simulated input simulating the generating of "J" because both of them are performing the same logic input operation of inputting a letter "j" to the user interface. Alternatively, one simulated input may be associated with two or more physical inputs. For example, a simulate input of capital letter "J" may be associated with simultaneous physical pressing of "shift" and "j" buttons on the physical keyboard 151.

In some embodiments, the simulated input module 141 may simulate each and all physical inputs that can be provided by the physical input devices 150. The simulated input module 141 may further generate simulated inputs 143 that mimic physical inputs from physical input devices 150 that are not supported by the PC 140. Thus, by implementing the simulated input module 141 on the PC 140, the physical input devices 150 may become optional. That is, the PC 140 may be able to receive inputs from the simulated input module 141, even if some or all of the physical input devices 150 are not physically connected to the PC 140.

In some embodiments, the mobile device 110 may be configured with a mobile input module 117. Specifically, the mobile input module 117 may be a software module executing in the operating system of the mobile device 110. Alternatively, the mobile input module 117 may be implemented as a computer chip or a hardware board plugged into the mobile device 110.

In some embodiments, the mobile input module 141 may provide a virtual input interface on the mobile device 110, in which a user may be able to provide virtual inputs 113 that can implement the input operations of the physical input devices 150 on the PC 140. Therefore, in terms of input operations, the simulated input module 141 may also be referred to as a "virtual input device" connected to the mobile device 110, comparable to the physical input devices 150 connected to the PC 140.

In some embodiments, the mobile input module 117 on the mobile device 110 may be configured to display, create, or edit a standard or custom mobile user interface (UI) 111 for accepting a user's inputs. The mobile input module 117 may also display on the mobile UI 111 one or more input mechanisms (e.g., a virtual/soft keyboard, or a custom input GUI) that allow the user to create, update, or input one or more virtual inputs 113. "Virtual input" may refer to any input a user inputs into the mobile UI 111 by using the input mechanisms made available by the mobile input module 117. For example, a mobile UI 111 with a soft touchpad may be displayed on a mobile device 110 having a multi-touch touch-screen, which allows a user to provide virtual inputs by touching/tapping/moving on the soft touchpad using one or more fingers and/or touch screen pen. In this case, a virtual input may be one distinct touching/tapping/moving action on the multi-touch touch-screen captured by the mobile UI 111 and the mobile input module 117. Alternatively, the mobile UI 111 may display a virtual keyboard, and the virtual inputs may be the pressing on the various keys displayed by the virtual keyboard.

In some embodiments, the mobile GUI 111 may display a virtual keyboard having multiple touchable keys similar to a physical keyboard. When a user utilizes the virtual keyboard to input into the mobile GUI 111, the mobile input module 117 may receive the virtual inputs 113 generated by the user touching the touch screen. In some cases, the virtual inputs 113 may be intended for use by the mobile device 110.

For example, the virtual inputs 113 may be the inputs of text messages into a social networking application executing on the mobile device 110.

In some embodiments, the mobile device 110 may be configured to remotely provide inputs into the PC 140 across the network 130. Specifically, a user may utilize the mobile device 110 to control and input-into the PC UI 145 displayed on the PC 140. For example, the PC 140 may display a complicated gaming application 145 that normally requires the simultaneous uses of a keyboard 151, mouse 153, touch pad 155, and/or joystick 157 for playing. In this case, since the mobile device 110 typically have a limited touch screen for display and inputs, it is hard for the user to remotely control the PC 140 with keyboard-like inputs available on the mobile device 110, in order to mimic the complicated physical inputs from the keyboard 151, mouse 154, touch pad 155, and/or joystick 157.

In some embodiments, the mobile input module 117 may create a virtual input 113 for simplifying the remote controlling of the PC 140. The creating of the virtual input includes the creating of a GUI element on the mobile GUI 111 and the creating of an input association between the newly created virtual input 113 and one or more simulated inputs 143, as well as storing the input association in the database 115 or in a cloud storage 135. An "input association" may refer to a one-to-many mapping relationship between a particular virtual input 113 and one or more corresponding simulated inputs 143. Further, an input association may also store information associated with the mapping. For example, an input association for a "combo virtual input" may store configuration indicating that the mapped simulated inputs 143 should be performed simultaneously or sequentially. And if performed sequentially, an input association for a "serial virtual input" may store the time lapse configuration among the sequential performing of the simulated inputs 143. Additional details are further described below.

In some embodiments, when the mobile input module 117 detects a user activating (e.g., by pressing or touching) a virtual input 113 on the mobile GUI 111, the mobile input module 117 may check whether an input association exists in the DB 115 that corresponds to the virtual input 113. If such an input association is found in the DB 115, the mobile input module 117 may retrieve the one or more simulated inputs based on this input association, and transmit the one or more simulated inputs to the simulated input module 141 on the PC 140 via the network 130.

In some embodiments, in response to the one or more simulated inputs received from the mobile input module 117, the simulated input module 141 may perform the one or more simulated inputs 143 on the PC UI 145, as if these simulated inputs are originated from the PC 140. Thus, by using the mobile input module 117 and the simulated input module 141, a user may be able to remotely control and input-into a PC 140 using the mobile device 110's limited input mechanisms.

In some embodiments, the mobile input module 117 may also transmit the configuration stored in the input association to the simulated input module 141 on the PC 140. Based on the received configuration, the simulated input module 141 may perform the one or more simulated inputs 143 on the PC UI 145 either simultaneously or sequentially. When performing simultaneously, the simulated input module 141 may simultaneously perform the simulated inputs 143 as if a user simultaneously activates the physical inputs that correspond to these simulated inputs 143. For example, a user may simultaneously press the "Ctrl", "Alt", and "Delete" buttons on a physical keyboard 151 at the same time. The simulated input module 141 may mimic this scenario by simultaneously perform three simulated inputs, which simulate the "Ctrl", "Alt", and "Delete" buttons, respectively.

In some embodiments, the simulated input module 141 may perform simulated inputs 143 on the PC UI 145 sequentially. In this case, the received configuration may indicate the order of performance among the simulated inputs 143, as well as the corresponding time internals among the simulated inputs for delay. Thus, the simulated input module 141 may perform the simulated inputs on the PC UI 145 in the order defined in the configuration, and every time a specific simulated input is performed, the simulated input module 141 may wait fora specified time internal as defined in the configuration, before performing the next simulated input.

In some embodiments, the mobile input module 117 may be configured to create input associations, store/retrieve input associations from/to the DB 115 and/or the cloud 135, convert the input associations to simulated inputs based on virtual inputs, and transmits the converted simulated inputs to the PC 140. Further, the mobile input module 117 may create or update custom GUIs 111 for displaying virtual inputs 113, store/retrieve the created custom GUIs 111 to/from the DB 115 and/or the cloud 135, and display the custom GUIs 111 on the mobile device 110.

In some embodiments, the input associations and custom GUIs 111 stored in the cloud 135 may be retrieved and used by other mobile devices 120. In other words, the other mobile devices 120 may retrieve the custom GUIs 111 stored in the cloud 135 for displaying, and use the input configurations in similar fashions as the mobile device 110. This way, a user may be able to create input configurations and custom GUIs 111 that can be shared in the cloud 135.

In some embodiments, the mobile input module 117 and the simulated input module 141 may each implement some of the other's functionalities. In other words, some of the functionalities of the mobile input module 117 (e.g., converting a virtual input 113 to associated simulated inputs 143) may be implemented and performed by the simulated input module 141 instead, and vise-versa. Alternatively, the functionalities of the mobile input module 117 and the simulated input module 141 may be combined, so that the mobile input module 117 and the simulated input module 141 may have similar functionalities, and either of these two modules may be deployed to either the mobile device 110 or the PC 140.

In some embodiments, each of the mobile device 110, mobile devices 120, and PC 130 may include physical hardware components such as, without limitation, one or more physical Central Processing Units (CPUs), memory, network communication module, and/or additional electronic circuit components (all of them are not shown in FIG. 1). The mobile device 110, mobile devices 120, and PC 130 may also include physical storage medium for data storage and data access. For example, the mobile device 110 may have rotational hard drives, SSD-based device using flash-based memory, or RAM-based storage medium. The physical storage medium in the mobile device 110 may provide various data storage services such as the database (DB) 115. The cloud 135 may provide network-based storage services that can be accessed via a network.

Figure 2:
FIG. 2 illustrates multiple mobile user interfaces (UIs) for defining virtual inputs that are associated with simulated inputs, according to one or more embodiments of the present disclosure.
Figure 2:
Figure 2:
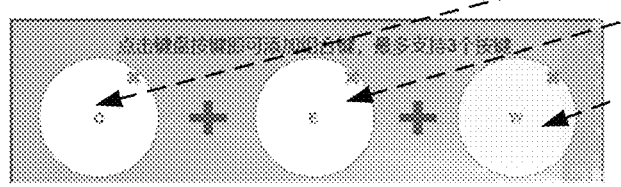
Figure 2:
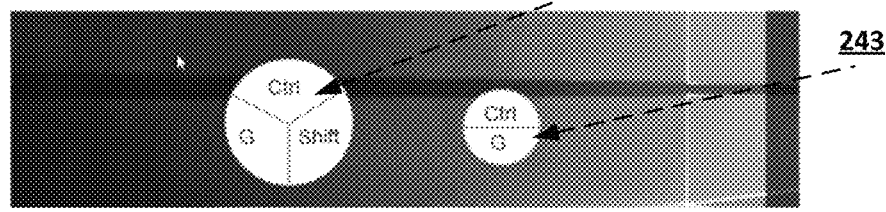

FIG. 2 illustrates multiple mobile user interfaces (UIs) for defining virtual inputs that are associated with simulated inputs, according to one or more embodiments of the present disclosure. In general, a mobile UI is small in size. When there is a need to simultaneously press on multiple buttons, a typical mobile UI cannot provide a user interface that allow the user's fingers to access and press these multiple buttons at the same time.

In FIG. 2, a mobile input module may display a mobile UI 210 on a mobile device to create a virtual input that can be mapped to a single or multiple simulated inputs. Specifically, the mobile UI 210 shows an interactive interface, in which a user may select the "Auxiliary Menu" pointed by the finger icon on the top right of the mobile UI 210. After the clicking of the "Auxiliary Menu", a selection panel may be shown on the mobile UI 210. The user may then click on the "Create Combination" button pointed by the finger icon on the left center of the mobile UI 210, in order to create a "combo virtual input" that combines multiple simulated inputs for simultaneous inputting. A mobile UI 220 may be displayed on the mobile device after the pressing of the "Create Combination" button In some embodiments, the mobile input module may pre-create a set of virtual inputs that have one-to-one associations with corresponding simulated inputs. For example, the mobile input module may initialize-create a virtual input of a character "a" to be associated with a simulated input of the character "a". Thus, a user may not need to set up these virtual inputs that correspond to their respective simulate inputs, and may only need to setup those virtual inputs that are not naturally corresponding to their respective simulate inputs. For example, a user may need to set up a virtual input for the character "a" if this virtual input is to be associated with another character (e.g., character "b") that is different from the character "a".

In some embodiments, the mobile input module may create combo virtual input with an input association, which associates the newly created virtual input with two or more simulated inputs. The new virtual input may then be displayed on the mobile UI, and the new input association may be stored in a DB or a cloud. Subsequently, once this new virtual input is activated by the user on the mobile UI, the mobile input module may retrieve the input association related to this virtual input from the DB or cloud, obtain the simulated inputs associated with this virtual input, and then transmit the simulated inputs to the PC for simultaneous operation.

In some embodiments, as illustrated in the mobile UI 220, the mobile input module may display a semi-transparent virtual keyboard (corresponding to a physical keyboard) and a semi-transparent panel above the virtual keyboard. This panel and the virtual keyboard may be used for creating a new combo virtual input with two or more simulated inputs. The panel may be further illustrated by the mobile UI 230. Mobile UI 230 shows multiple input-holders (shown as circles) for assigning multiple simulated inputs to a virtual input. Specifically, a user may select circle 231, and then pressing a corresponding key from the virtual keyboard as displayed in the mobile UI 220. The pressed corresponding key may be deemed a simulated input to be performed on the PC. The user may then subsequently select circle 233 and circle 235, and assign corresponding keys from the virtual keyboard. The assigned keys may be associated with simulated inputs to be performed on the PC.

In some embodiments, the mobile input module may also display a virtual mouse corresponding to a physical mouse, a virtual touchpad corresponding to a physical touchpad, or a virtual joystick corresponding to a physical joystick on the mobile UI 220, similarly to the displaying of the virtual keyboard on the mobile UI 220. In this case, the user may assign the keys of the virtual mouse, virtual touchpad, or virtual joystick to the circles 231, 233, and/or 235, so that a combination of simulated inputs from keyboard, mouse, touchpad, and/or joystick may be associated with a newly created virtual input.

In some embodiments, at least two keys, and with no upper limiting number of keys, may be selected to form a combo virtual input. The order of adding the keys to this virtual input may be from left to right, and the currently selected input-holder (circle) may be displayed with a highlight effect. For example, in the mobile UI 230, when the first circle 231 has the UI focus for inputting, it may be displayed as being highlighted. After the user assigned a key to the first circle, the mobile UI 230 may automatically move the UI focus to the second circle 233, and highlight this second circle 233.

In some embodiments, after one combo virtual input is created, a corresponding icon may be displayed on a mobile UI, similar to mobile UI 240. These icons may be the mechanisms to activate these virtual inputs. In mobile UI 240, a combo virtual input 241 and a combo virtual input 243 are displayed. The virtual input 241 may be the combination of three keys "Ctrl", "Shift" and "G", and the virtual input 243 may be the combination of two keys "Ctrl" and "G". When a user presses on the virtual input 241 on the mobile UI 240, the mobile input module may retrieve the input association corresponding to the virtual input 241, retrieve the three simulated inputs (i.e., "Ctrl", "Shift", and "G") associated with this virtual input, and transmit these three simulated inputs to the remote PC for inputs.

In some embodiments, a virtual input may be edited after creation. Specifically, a user may click on an "Edit Combination" selection in the mobile UI, and a combination editing page may be displayed. The combination editing page may look similar to the combination creation page as shown in the mobile UI 230, and the selected simulated inputs are displayed. When the user clicks on a circle, the selected circle may be highlight. The user may then select another key from the virtual keyboard to be assigned to the selected circle, and the adjacent circle may be highlighted for editing. After the modification is completed, the edited virtual input along with its input association may be saved.

For example, the user may first assign A, B, C to the three circles 231, 233, and 235. After the user selects the circle showing B and modifies the assigned key, the selected effect and highlight effect may be moved to the circle showing C, and the assignment of C can be modified or deleted. If assignment of C is modified or deleted, the selected effect and the highlight effect may remain on the circle previously showing the C.

In some embodiments, after a simulated input is assigned in a circle, an X appears in its upper right corner, as shown in the mobile UI 230. The user can choose to clear the assigned key by clicking the X, and the circle is again selected and highlighted. The next assigned key may shift left to replace the deleted key circle, and the subsequent keys may also shift left accordingly.

For example, a virtual input may be created as a three-key combination: Q+W+E. In a first example, when the user deletes Q, the circle previously occupied by Q (circle 231) may be selected and highlighted, and W and E may each move left one circle, leaving the third circle becomes blank or "optional". In a second example, when a user deletes W, the circle previously occupied by W (circle 233) may be selected and highlighted, E may be moved left to the circle previously occupied by W, and the third circle may be blank or "optional". In a third example, when the user deletes E, the circle previously occupied by E (circle 235) may be selected and highlighted, and this circle may be blank or "optional". Likewise, the user may also remove a created combo virtual input. Thus, by allowing the creating of virtual input that maps to multiple simulated inputs, a user can create shortcuts to simultaneously generate multiple inputs according to his own needs, In some embodiments, the user may create a virtual input that maps to a sequence of simulated inputs. Such a virtual input may be referred to as a serial virtual input, which allows the user to achieve continuous and rapid inputs on the remote PC via the mobile device. For example, when a user is playing a game on the remote PC via the mobile device, the user may create a serial virtual input that simulate the rapid repeating pressing of a single key on the physical keyboard, or simulate the repeating of a sequential set of keys being pressed on the physical keyboard.

In some embodiments, the serial virtual input may be similarly created using the mobile UI 230, and the sequence of keys may be assigned from left to right to the circles 231, 233, and 235, respectively, indicating a sequential order from left to right. In addition, a specific time interval may be set between any two adjacent circles. Exemplary time intervals may be customized or predefined as including 20 milliseconds, 100 milliseconds, 500 milliseconds, 1 second, 1.5 second, 2 seconds, 3 seconds, and 5 seconds, etc. Thus, when this serial virtual input is activated, a corresponding sequence of simulated inputs may be transmitted to the remote PC. During operation, the sequence of simulated inputs may be individually performed by the simulated input module one at a time, with a delay in performing the next simulated input in the sequence based on the configured time intervals.

Figure 3:
FIG. 3 illustrates multiple mobile user interfaces for defining and adjusting custom GUIs, according to one or more embodiments of the present disclosure.
Figure 3:

FIG. 3 illustrates multiple mobile user interfaces for defining and adjusting custom GUIs, according to one or more embodiments of the present disclosure. In addition to the creating and editing of the virtual inputs, a user may also edit the layout of the virtual inputs displayed on the mobile UI. For example, the user may set the positions of the virtual inputs to desired places in a custom mobile UI, and adjust the sizes, colors, and shapes of the desired virtual inputs. In some embodiments, as shown in UI 310, a user may adjust the size of the combo virtual input to any particular size that is supported by the custom mobile UI, or change the style of the virtual inputs being displayed In some embodiments, due to the small display area on the mobile device, when inputs and outputs are performed at the same time, there may be too many virtual input buttons displayed on the mobile UI that may affect the user's access to information on the interactive interface. In this case, a user may create a custom mobile UI to organize the one or more virtual inputs.

In some embodiments, the mobile input module may create a customized mobile UI that can store multiple virtual inputs. The UI 320 may show such a customized mobile UI that is shaped like a ring with multiple partitions including a center partition and surrounding pie-shaped partitions. This customized mobile UI may be referred to as a "trick-ring". Further, the trick-ring may have two displayable states, a compact state and an expanded state. When the trick-ring is in the compact state, only a small icon may be displayed on the mobile UI 320, The small icon may be a circle, a square, or any other shapes. When the trick-ring is in the expanded state, as shown in the UI 320, the above-mentioned small icon may expand into a circle having partitions that can store multiple virtual inputs, and each of the partitions may act as a clickable button. Further, the display effect of these buttons can be changed when being pressed and dragged.

In some embodiments, the UI 320 may show a custom mobile UI semi-transparently displayed above a desktop. In the UI 320, a trick-ring 321 is displayed with multiple virtual inputs being assigned to its partitions. A user may create or change the trick-ring 321 using any keys of a soft keyboard, as well as any combo virtual inputs or serial virtual inputs previous created. The selected keys and virtual inputs may appear in the various partitions in the circle. In addition, the buttons on the trick-ring 321 may also be customized to different sizes, and the diameter of the expanded state of the trick-ring 321 can be customized to be X times the diameter of the compact state. Afterward, the trick-ring 321 can be placed anywhere on the mobile UI of the mobile device.

In some embodiments, when the user touches the interaction area of the trick-ring 321, it may change from the compact state to the expanded state. When the trick-ring 321 is in the expanded state, the specific stored virtual inputs may be displayed and pressed. That is, activating the virtual inputs in the trick-ring 321 can only be performed in the expanded state. Different types of activations, such as one-click, double-clock, long-press, and other dragging or moving methods, can be made by touching the interactive area of the virtual inputs displayed on the expanded trick-ring 321.

In some embodiments, some or all of the mobile UIs may be displayed on the mobile device's display screen with a level of transparency that can be customized. In other words, the displayed virtual keyboard and virtual inputs may be super-imposed above other displayed UIs (e.g., App UIs) on the mobile device, with a level of transparency that allows a user to see through the mobile UIs and recognize the App UIs. In this way, the virtual inputs would not affect other interface display on the mobile device. Moreover, the transparency level can be customized by the user to allow more or less see-through effect.

Figure 4:
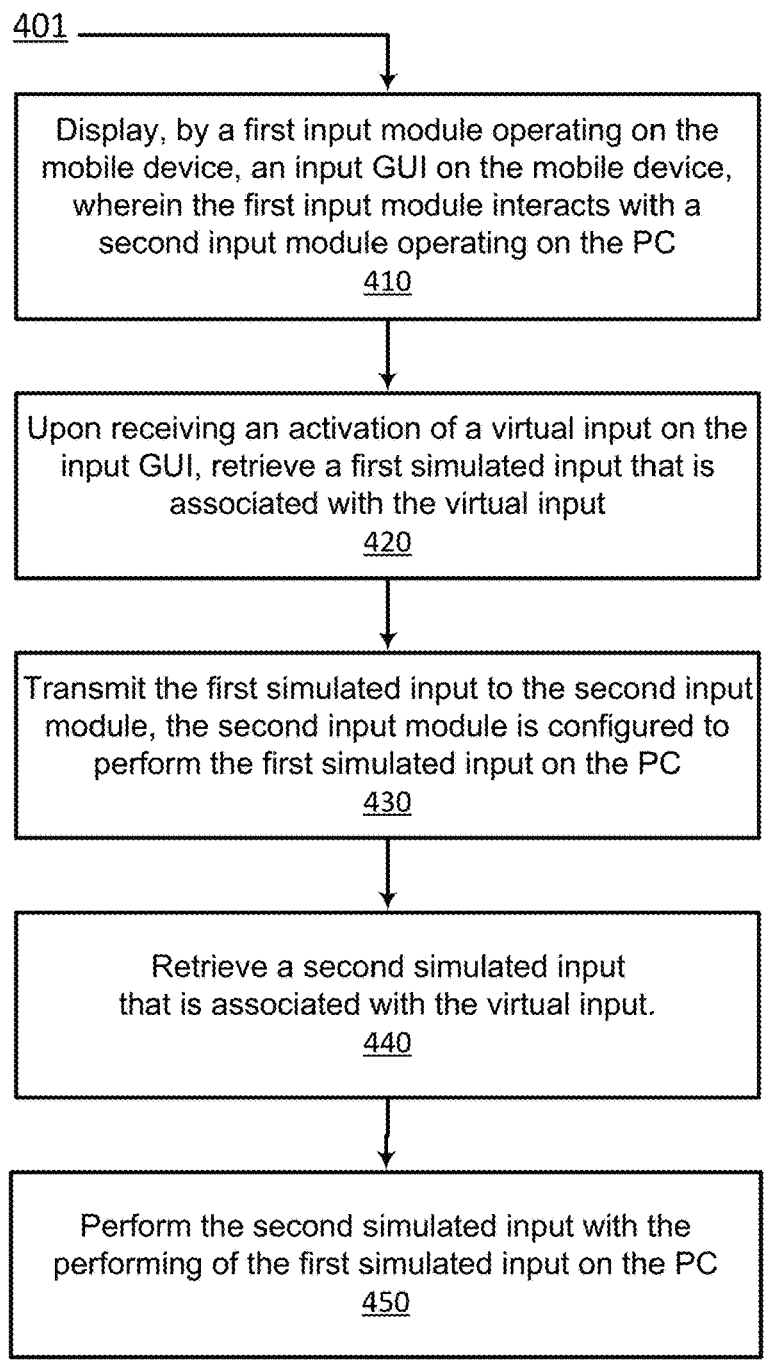
FIG. 4 shows a flow diagram illustrating a process to remotely control a PC from a mobile device, according to one or more embodiments of the present disclosure.

FIG. 4 shows a flow diagram illustrating a process to remotely control a PC from a mobile device, according to one or more embodiments of the present disclosure. The processes 401 may set forth various functional blocks or actions that may be described as processing operations, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined operations and operations are only provided as examples, and some of the operations and operations may be optional, combined into fewer operations and operations, or expanded into additional operations and operations without detracting from the essence of the disclosed embodiments. Moreover, one or more of the outlined operations and operations may be performed in parallel.

At block 410, a mobile input module (or first input module) operating on the mobile device may display an input GUI on the mobile device. The first input module may interact with a simulated input module (or second input module) operating on the PC.

At block 420, the input GUI may have a virtual input displayed. Upon receiving an activation of a virtual input on the input GUI, the first input module may retrieve a first simulated input that is associated with the virtual input. In some embodiments, the virtual input corresponds to a first input operation, and the simulated input corresponds to a second input operation that is different from the first input operation. For example, the first input operation may be the inputting of a character "A", and the second input operation may be the inputting of a different character "B".

In some embodiments, the first input module may retrieve, from a cloud, an input association based on the virtual input. The input association was previously created along with the virtual input, and associates the virtual input with the first simulated input. Afterward, the first input module may retrieve the first simulated input from the input association.

At block 430, the first input module may transmit the first simulated input to the second input module. The second input module may be configured to perform the first simulated input on the PC in response to the activation of the virtual input on the input GUI.

At block 440, upon receiving the activation of the virtual input on the input GUI, the first input module further retrieves a second simulated input that is associated with the virtual input. In other words, the virtual input may be associated with the first simulated input and the second simulated input. In some embodiments, the second simulated input corresponds to a third input operation that is different from the first input operation. In some embodiments, the second input operation or the third input operation is selected from key operations of a physical keyboard, button operations and/or scroll operations of a physical mouse, touch operations of a touchpad, and button operations and/or sticks operations of a physical joystick.

At block 450, the first input module may transmit the second simulated input to the second input module. And the second input module is configured to perform the second simulated input simultaneous to the performing of the first simulated input on the PC. Alternatively, the second input module is configured to sequentially perform the first simulated input and the second simulated input on the PC. In some embodiments, when sequentially performing of the first simulated input and the second simulated input, after complete performing the first simulated input, the second input module may wait for a predefined time interval before performing the second simulated input.

Figure 5:
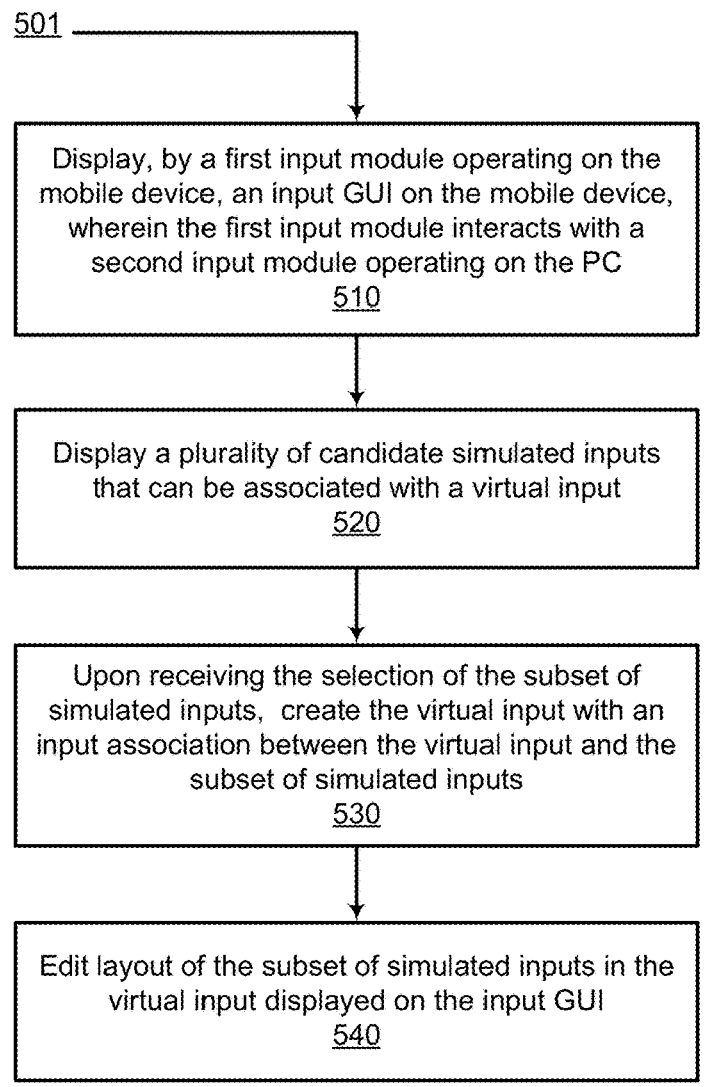
FIG. 5 shows a flow diagram illustrating a process to create a virtual input for remote controlling of a PC from a mobile device, according to one or more embodiments of the present disclosure.

FIG. 5 shows a flow diagram illustrating a process to create a virtual input for remote controlling of a PC from a mobile device, according to one or more embodiments of the present disclosure. The processes 501 may set forth various functional blocks or actions that may be described as processing operations, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined operations and operations are only provided as examples, and some of the operations and operations may be optional, combined into fewer operations and operations, or expanded into additional operations and operations without detracting from the essence of the disclosed embodiments. Moreover, one or more of the outlined operations and operations may be performed in parallel.

At block 510, a mobile input module (or first input module) operating on the mobile device may display an input GUI on the mobile device. The first input module may interact with a simulated input module (or second input module) operating on the PC.

At block 520, the first input module may display a plurality of candidate simulated inputs that can be associated with a virtual input.

At block 530, a user may select a subset of the candidate simulated inputs from the plurality of candidate simulated inputs. Upon receiving the selection of the subset of simulated inputs, the first input module may create the virtual input with an input association between the virtual input and the subset of simulated inputs, The created virtual input may be activated, displayed or adjusted on the input GUI.

At block 540, a user may edit layout of the subset of simulated inputs in the virtual input displayed on the input GUI. Specifically, the editing of the layout includes setting positions, sizes, colors, and shapes of the simulated inputs displayed on the input GUI. In some embodiments, the created virtual input may be a combo virtual input, and when activated, the second input module is configured to simultaneously perform the subset of simulated inputs on the PC. Alternatively, the created virtual input may be a serial virtual input, and when activated, the second input module is configured to sequentially perform the subset of simulated inputs on the PC.

Figure 6:
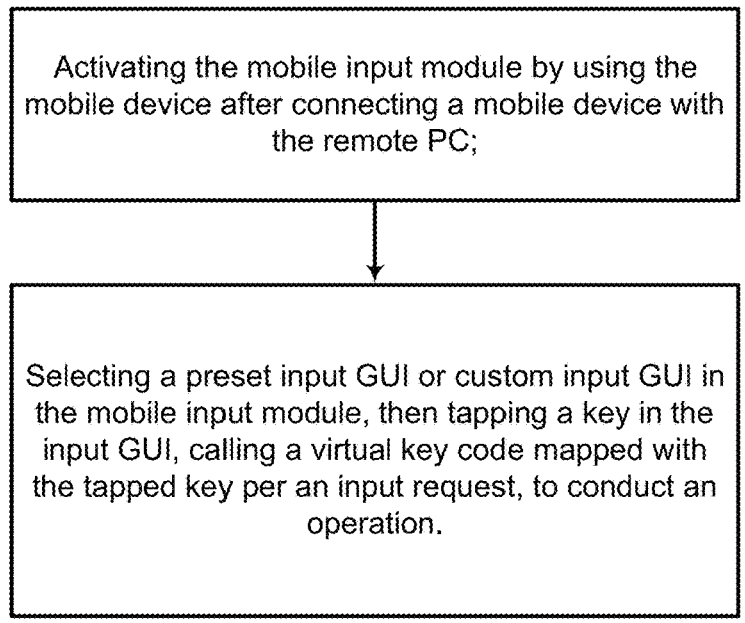
FIG. 6 shows a flowchart of a method according to the present disclosure.
Figure 7:
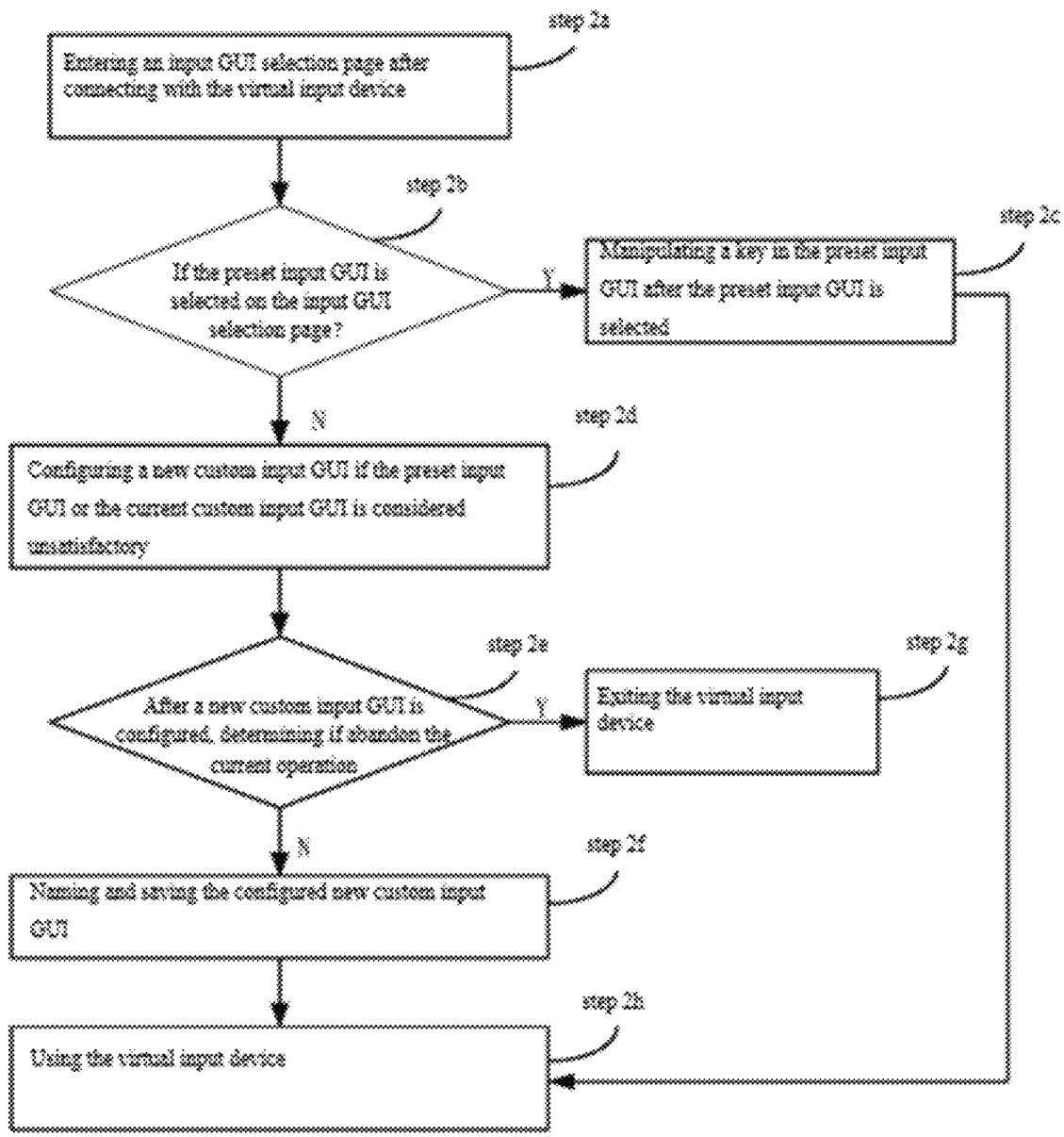
FIG. 7 shows a flowchart of a process to select one of two input GUIs according to the present disclosure.
Figure 8:
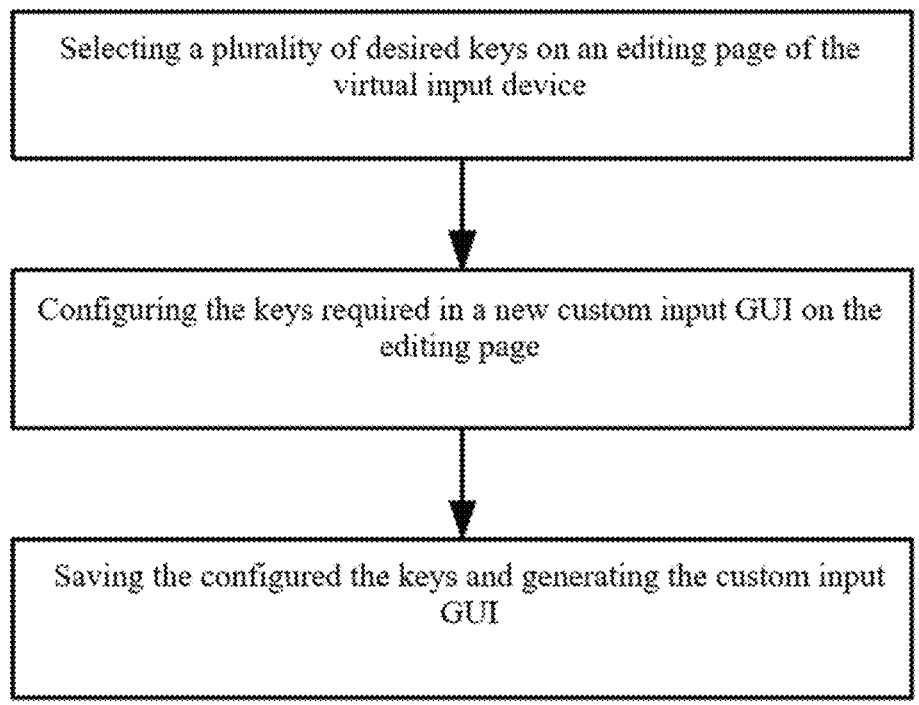
FIG. 8 shows a flowchart of a process to configure a new custom input GUI according to the present disclosure.

FIGS. 6, 7, and 8 show flow diagrams illustrating processes to balance disk usages in a virtualized computing environment, according to one or more embodiments of the present disclosure. The processes in FIGS. 6-8 may set forth various functional blocks or actions that may be described as processing operations, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined operations and operations are only provided as examples, and some of the operations and operations may be optional, combined into fewer operations and operations, or expanded into additional operations and operations without detracting from the essence of the disclosed embodiments. Moreover, one or more of the outlined operations and operations may be performed in parallel.

As shown in FIGS. 6 to 8, the present disclosure provides a process for remotely controlling a personal computer (PC) based on a mobile device. The method includes the following operations:

Operation 1, activating mobile UI by using the mobile device after connecting the mobile device with a remote PC;

Operation 2, selecting a preset input GUI or a custom input GUI displayed in the mobile device, then tapping a key in the input GUI, calling an input association mapped with the tapped key per an input request, to conduct an operation.

In operation 2, the selection of the preset input GUI or custom input GUI is achieved by:

operation 2a, entering an input GUI selection page;

operation 2b, selecting the preset input GUI or the current custom input GUI on the input GUI selection page, and proceeding to operation 2c if the preset input GUI is selected, otherwise proceeding to operation 2d;

operation 2c, proceeding to operation 2h by manipulating a key in the preset input GUI after the preset input GUI is selected;

operation 2d, configuring a new custom input GUI if the preset input GUI or the current custom input GUI is considered unsatisfactory;

operation 2e, after a new custom input GUI is configured, directly proceeding to operation 2g if selecting to abandon the current operation, or proceeding to operation 2f if selecting to save the current configuration;

operation 2f, naming and saving the configured new custom input GUI and proceeding to operation 2h;

operation 2g, exiting the mobile UI; and operation 2h, using the mobile UI.

In operations 2b and 2d, each of the current and new custom input GUIs may be configured by:

selecting a plurality of desired keys on an editing page of the mobile UI;

naming the keys as desired and editing display layouts of the keys and of the input GUI on the editing page; and saving the display layout and generating the custom input GUI.

In operation 2e, the newly configured custom input GUI is optionally sent to a cloud configured to store custom GUI.

Editing the display layout of the keys in the custom input GUI may include setting their positions in the input GUI, sizes, colors and shapes.

Editing the display layout of the input GUI may include setting its style.

The style of the input GUI may include its color, size, shape and the like.

The custom input GUI may include at least one of a physical keyboard, a physical mouse, a physical touchpad, and a physical joystick.

The physical keyboard may include at least one of alphabet keys, function keys, navigation keys and number keys.

The physical mouse may include buttons and/or a mouse scroll.

The physical touchpad may include a touchable screen supporting multi-touches.

The physical joystick may include buttons and/or control sticks.

The present disclosure also provides a system for remotely controlling a personal computer (PC) based on a mobile device. The system includes a mobile device with a mobile input module.

In the system, after the mobile device is connected to the remote PC, the mobile input module is activated by using the mobile device.

A preset input GUI or custom input GUI is displayed by the mobile input module, and then a corresponding operation is conducted by tapping a key in the input GUI and calling a virtual key code mapped with the tapped key per an input request.

In the mobile GUI, the selection of the preset input GUI or custom input GUI may be achieved by:

entering an input GUI selection page after connecting with the virtual input device;

selecting the preset input GUI or the current custom input GUI on the input GUI selection page, and tapping a selection key for the preset input GUI on the input GUI selection page if the preset input GUI is to be selected, so as to enter the preset input GUI;

configuring a new custom input GUI if the preset input GUI or the current custom input GUI is considered unsatisfactory;

after a new custom input GUI is configured, it is possible to select to abandon the current operation and directly exiting the virtual input device; and naming and saving the new custom input GUI if selecting to save the current configuration, wherein after the saving, it is possible to select to use the custom input GUI directly, or to select to use the custom input GUI directly or edit the custom input GUI when entering the virtual input device again.

Each of the current and new custom input GUIs is configured by:

selecting a plurality of desired keys on an editing page of the virtual input device;

naming the keys as desired and editing display layouts of the keys and of the input GUI on the editing page; and saving the display layout and generating the custom input GUI.

Editing the display layout of the keys in the custom input GUI may include setting their positions in the input GUI, sizes, colors and shapes.

Editing the display layout of the input GUI may include setting its style. The style of the input GUI may include its color, size, shape and the like.

The custom input GUI may include at least one of a physical keyboard, a physical mouse, a physical touchpad, or a physical gamepad.

The physical keyboard may include at least one of alphabet keys, function keys, navigation keys and number keys.

The physical mouse may include buttons and/or a mouse scroll.

The physical gamepad may include buttons and/or joysticks.

According to the present disclosure, the mobile device can be used to control various applications on the remote PC without any peripheral device. The mobile device may include, but is not limited to, a smart mobile phone, a tablet or any other smart touch device.

According to the present disclosure, the mobile input module provides the preset input GUI composed of a preset soft keyboard, keys common in use in various games or keys set for a dedicated particular game, and provides a custom input GUI configured by editing a layout of desired keys based on the need of the user.

The system further comprises a cloud configured to store custom GUI. After a new custom input GUI is configured, the mobile input module sends the newly configured custom input GUI to the cloud.

Since the mobile input module is capable for information interaction with the cloud, the user can upload favorable custom input GUIs having been configured to the cloud by using the mobile input module so that other users can download the uploaded custom input GUIs by using a device, use them directly or after further editions, and give a "like" or "comment" to them.

In the custom input GUI of the mobile input module, the user may be allowed to set the keys' contents, number, positions (any of the key can be dragged to any position on the screen without limitation), sizes, layout, use-pattern and the like and personalize their colors, skins and the like. After being saved, further modifications and editions may be also allowed.

The present disclosure aims to provide to a solution to users pursuing access to a remote PC's desktop through using a mobile device while not possessing a suitable peripheral device. Currently, few custom virtual keyboards are known and they may only be configured for APPs on mobile devices, such as Apps for social chatting, network access, etc., and game operation devices are dedicated devices configured by the respective game enterprises. Therefore, the known custom keyboards for mobile devices are strongly limited in their application. By contrast, the present disclosure provides a user with a customizable input GUI without using any peripheral device, which includes a virtual keyboard (including function keys, alphabet keys, navigation keys, symbol keys, number keys, etc.), a virtual mouse and/or a virtual gamepad and enables access to a remote PC for convenient social networking, network access and PC gaming. Further, the user can customize the input GUI based on its own use habits, particular tasks, feelings and the like so as to achieve more convenient and fixable operations that better satisfy the user's personalized needs.

Thus, systems and methods for remotely control a PC from a mobile device have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a specific-purpose computer selectively activated or configured by a computer program stored in the computer. In particular, various specific-purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or operations do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for controlling a personal computer (PC) from a mobile device, comprising:
    displaying, by a first input module operating on the mobile device, an input GUI on the mobile device, wherein the first input module interacts with a second input module operating on the PC;
    upon receiving an activation of a virtual input on the input GUI, retrieving a first simulated input and a second simulated input that are associated with the virtual input, wherein the virtual input corresponds to a first input operation that is one touch on a touch screen of the mobile device; and
    transmitting the first simulated input and the second simulated input to the second input module, wherein the second input module is configured to perform the first simulated input and the second simulated input on the PC in response to the activation of the virtual input on the input GU;
    wherein the method further comprises editing a layout of the virtual input on the input GUI, and the editing of the layout comprises setting positions, sizes, colors, and shapes of the virtual input on the input GUI.

2. The method as recited in claim 1,
    wherein the second input module is configured to perform the second simulated input simultaneous to the performing of the first simulated input on the PC.

3. The method as recited in claim 2, wherein the first simulated input corresponds to a second input operation that is different from the first input operation.

4. The method as recited in claim 3, wherein the second simulated input corresponds to a third input operation that is different from the first input operation.

5. The method as recited in claim 4, wherein the second input operation or the third input operation is selected from key operations of a physical keyboard, button operations and/or scroll operations of a physical mouse, touch operations of a touchpad, and button operations and/or sticks operations of a physical joystick.

6. The method as recited in claim 1,
    wherein the second input module is configured to sequentially perform the first simulated input and the second simulated input on the PC.

7. The method as recited in claim 6, wherein the sequentially performing of the first simulated input and the second simulated input further comprising:

after complete performing the first simulated input, waiting for a predefined time interval before performing the second simulated input.

8. The method as recited in claim 1, wherein the retrieving of the first simulated input that is associated with the virtual input comprising:
retrieving, from a cloud, an input association based on the virtual input, wherein the input association associates the virtual input with the first simulated input; and
retrieving the first simulated input from the input association.

9. A method for controlling a personal computer (PC) from a mobile device, comprising:
displaying, by a first input module operating on the mobile device, an input GUI on the mobile device, wherein the first input module interacts with a second input module operating on the PC;
upon receiving an activation of a virtual input on the input GUI, retrieving a plurality of simulated inputs that is associated with the virtual input, wherein the virtual input corresponds to one touch on a touch screen of the mobile device; and
transmitting the plurality of simulated inputs to the second input module, wherein the second input module is configured to perform each of the plurality of simulated inputs on the PC;
wherein the method further comprises editing a layout of the virtual input on the input GUI, and the editing of the layout comprises setting positions, sizes, colors, and shapes of the virtual input on the input GUI.

10. The method as recited in claim 9, wherein each of the plurality of simulated inputs corresponds to a different input operation selected from input operations of a physical keyboard, button operations and/or scroll operations of a physical mouse, and button operations and/or joysticks operations of a physical gamepad.

11. The method as recited in claim 9, wherein the second input module simultaneously perform the plurality of simulated inputs on the PC in response to the activation of the virtual input.

12. The method as recited in claim 9, wherein the second input module sequentially perform the plurality of simulated inputs on the PC in response to the activation of the virtual input.

13. A method for remotely controlling a personal computer (PC) from a mobile device, comprising:
displaying, by a first input module operating on the mobile device, an input GUI on the mobile device, wherein the first input module interacts with a second input module operating on the PC;
displaying, by the first input module, a plurality of candidate simulated inputs that can be associated with a virtual input, wherein the virtual input corresponds to a one touch on a touch screen of the mobile device; and
upon receiving a selection of a subset of simulated inputs from the plurality of candidate simulated inputs, creating, by the first input module, the virtual input with an input association between the virtual input and the subset of simulated inputs, wherein when the virtual input is activated on the input GUI,
the first input module is configured to retrieve, based on the input association, the subset of simulated inputs that are associated with the virtual input, and transmit the subset of simulated inputs to the second input module, and
the second input module is configured to perform the subset of simulated inputs on the PC;
wherein the method further comprises editing layout of the subset of simulated inputs in the virtual input displayed on the input GUI, wherein the editing of the layout includes setting positions, sizes, colors, and shapes of the simulated inputs displayed on the input GUI.

14. The method as recited in claim 13, further comprising:
adjusting position of the created virtual input on the input GUI.

15. The method as recited in claim 14, further comprising:
displaying, by the first input module, a trick-ring for arranging the virtual input on the mobile device.

16. The method as recited in claim 15, wherein the displaying of the trick-ring comprising:
arranging the virtual input with a plurality of virtual inputs in multiple partitions.

17. The method as recited in claim 16, wherein the displaying of the trick-ring comprising:
when the trick-ring is in an expanded state, allowing the virtual input and the plurality of virtual inputs to be activated by user touching.

18. The method as recited in claim 13, wherein the virtual input is a combo virtual input, and the second input module is configured to simultaneously perform the subset of simulated inputs on the PC.

19. The method as recited in claim 13, wherein the virtual input is a serial virtual input, and the second input module is configured to sequentially perform the subset of simulated inputs on the PC.

* * * * *